(12) United States Patent
Karczewicz

(10) Patent No.: US 8,488,672 B2
(45) Date of Patent: Jul. 16, 2013

(54) MODE UNIFORMITY SIGNALING FOR INTRA-CODING

(75) Inventor: Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1119 days.

(21) Appl. No.: 12/040,696

(22) Filed: Feb. 29, 2008

(65) Prior Publication Data

US 2008/0260027 A1    Oct. 23, 2008

Related U.S. Application Data

(60) Provisional application No. 60/912,364, filed on Apr. 17, 2007.

(51) Int. Cl.
*H04N 11/02* (2006.01)

(52) U.S. Cl.
USPC .................................................. 375/240.12

(58) Field of Classification Search
USPC .................. 375/240, 240.12, 240.15, 240.29
See application file for complete search history.

(56) References Cited

U.S. PATENT DOCUMENTS

| | | | |
|---|---|---|---|
| 5,815,601 A | 9/1998 | Katata et al. | |
| 5,974,181 A | 10/1999 | Prieto | |
| 6,157,676 A | 12/2000 | Takaoka et al. | |
| 6,476,805 B1 | 11/2002 | Shum et al. | |
| 6,654,503 B1 | 11/2003 | Sudharsanan et al. | |
| 7,142,231 B2 * | 11/2006 | Chipchase et al. | 348/14.02 |
| 7,664,184 B2 | 2/2010 | Reznic et al. | |
| 7,751,479 B2 | 7/2010 | Paniconi et al. | |
| 7,792,390 B2 | 9/2010 | Prakash et al. | |
| 7,847,861 B2 * | 12/2010 | Zhai et al. | 348/394.1 |
| 8,024,121 B2 | 9/2011 | Tang | |
| 2002/0055215 A1 | 5/2002 | Tamura et al. | |
| 2003/0223493 A1 | 12/2003 | Ye et al. | |
| 2005/0243920 A1 | 11/2005 | Murakami et al. | |
| 2006/0120456 A1 | 6/2006 | Tasaka et al. | |
| 2006/0153295 A1 | 7/2006 | Wang et al. | |
| 2006/0218482 A1 | 9/2006 | Ralston et al. | |
| 2007/0002945 A1 | 1/2007 | Kim | |
| 2007/0025631 A1 | 2/2007 | Kim et al. | |
| 2007/0070082 A1 | 3/2007 | Brennan | |
| 2008/0260030 A1 | 10/2008 | Karczewicz | |
| 2008/0260031 A1 | 10/2008 | Karczewicz | |

FOREIGN PATENT DOCUMENTS

| | | |
|---|---|---|
| CN | 1662066 A | 8/2005 |
| JP | 1155678 A | 6/1989 |
| JP | 2070127 A | 3/1990 |
| JP | 2002135126 A | 5/2002 |
| JP | 2006295408 A | 10/2006 |
| JP | 2008022405 A | 1/2008 |
| WO | WO2005107267 A1 | 11/2005 |
| WO | WO2008088140 A1 | 7/2008 |

OTHER PUBLICATIONS

Fu, et al.: "A Comparative Study of Compensation Techniques in Directional DCT's," IEEE International Symposium on Circuits and Systems (ISCAS) 2007, pp. 521-524, May 27-30, 2007.
Karczewicz, M.: "Improved Intra Coding," ITU-Telecommunications Standardization Sector, Study Group 16, Question 6, Video Coding Experts Group (VCEG), Document No. VCEG-AF15, pp. 1-4, XP030003536, 32nd Meeting: San Jose, CA, USA, Apr. 20-21, 2007.
Robert, et al.: "Improving Intra mode coding in H.264/AVC through block oriented transforms," 2006 IEEE 8th Workshop on Multimedia Signal Processing, pp. 382-386. Oct. 3-6, 2006.
Sekiguchi, et al.: "Results of CE on Separate Prediction Modes for 4:4:4 Coding (CE9)," Joint Video Team (JVT) of ISO/IEC MPEG & ITU-T VCEG, (ISO/IEC JTC1/SC29/WG11 and ITU-T SG16 Q.6), Document No. JVT-R031, pp. 1-28, 18th Meeting: Bangkok, TH, Source: Mitsubishi Electric Corporation, Jan. 14-20, 2006.
Tan, et al.: "Spatially Compensated Block-Based Transform," Proceedings of the Seventh IASTED International Conference Signal and Image Processing, pp. 92-97, XP008097050, Aug. 15, 2005.
Xu, et al.: "Lifting-Based Directional DCT-Like Transform for Image Coding," IEEE International Conference on Image Processing (ICIP) 2007, vol. 3, pp. III-185-III-188.
Yu, et al.: "Low Complexity Intra Prediction," ITU-Telecommunications Standardization Sector, Study Group 16, Question 6, Video Coding Experts Group (VCEG), Document No. VCEG-Z14r1, pp. 1-4, 26th Meeting: Busan, KR, Apr. 16-22, 2005.
Zeng, et al.: "Directional Discrete Cosine Transforms for Image Coding," 2006 IEEE International Conference on Multimedia and Expo, pp. 721-724, Jul. 9-12, 2006.

(Continued)

*Primary Examiner* — Man Phan
*Assistant Examiner* — Nourali Mansoury
(74) *Attorney, Agent, or Firm* — John G. Rickenbrode

(57) ABSTRACT

Techniques for efficiently signaling one or more prediction modes for blocks in a macroblock. A mode uniformity indicator is provided for each macroblock to indicate whether all blocks in the macroblock are to be predicted using the same prediction mode. In an embodiment, an encoder signals a mode uniformity indicator and a prediction mode. In another embodiment, a decoder receives a mode uniformity indicator and a prediction mode, and predicts at least two blocks of the macroblock using the prediction mode if the mode uniformity indicator is true.

21 Claims, 4 Drawing Sheets

OTHER PUBLICATIONS

Draft ISO/IEC 14496-10: 2002(E) Section 9.1.5.1; "Text of Final Committee Draft of Joint Video Specification (ITU-T Rec, H.264, ISO/IEC 14496-10 AVC)," International Organisation for Standardisation Organisation Internatonale de Normalisation, ISO/IEC JTC1/SC29/WG11 Coding of Moving Pictures and Audio, MPEG02/N4920, p. 83 with figure 9-1, Editor Thomas Wiegand, Klagenfurt, AT, Jul. 2002.

ITU-T H.264: "Series H: Audiovisual and Multimedia Systems Infrastructure of audiovisual services—Coding of moving video; Advanced video coding for generic audiovisual services," pp. 1-341, Telecommunication Standardization Sector of ITU, International Telecommunication Union, Mar. 2005.

International Search Report—PCT/US2008/060539, International Searching Authority—European Patent Office—Oct. 31, 2008.

Written Opinion—PCT/US2008/060539, International Searching Authority—European Patent Office—Nov. 31, 2008.

VCEG-N54 is an ITU-T VCEG Group meeting contribution submitted by Greg Conklin of RealNetworks.

JVT-B118r4 was submitted to the JVT ISO/IEC MPEG/VCEG group by Thomas Wiegand and Gary Sullivan.

"Advanced Video Coding for Generic Audiovisual Services," ITU-T Standard Pre-published (P), International Telecommunication Union, Geneva, N. H264 3/5, Mar. 1, 2005, XP002448756.

Bing Zeng et al: "Directional Discrete Cosine Transforms for Image Coding" Multimedia and Expo, 2006 IEEE International Conference on, IEEE, Jul. 1, 2006, pp. 721-724, XP031 032937 ISBN: 97S-1-4244-0366-0.

International Search Report—OCT/US2008/060535, International Searching Authority—European Patent Office—Oct. 14, 2008.

International Search Report—PCT/US2008/060537, International Searching Authority—European Patent Office—Oct. 15, 2008.

"Text of ISO/ IEC 14496-10 FCD Advanced Video Coding" Video Standards and Drafts, various authors, No. N4920, Aug. 11, 2002, XP030012343, Section 9.1.5.1, p. 83 with figure 9-1.

Written Opinion—PCT/US2008/060535, International Searching Authority—European Patent Office—Oct. 14, 2008.

Written Opinion—PCT/US2008/060537, International Searching Authority—European Patent Office—Oct. 15, 2008.

Yu L, Feng Y.: "Low-complexity intra prediction" Video Standards and Drafts, No. VCEG-Z14r1, Apr. 18, 2005, XP030003459.

Fu, Jingjing, et al, "Diagonal Discrete Cosine Transforms for Image Coding," (Nov. 2, 2006), Advances in Multimedia Information Processing—Proceedings of the 7th Pacific Rim Conference on Multimedia, PCM 2006, Huangzhou, China, Nov. 2-4, 2006 Lecture Notes in Computer Science;LNCS, Springer, Berlin, DE, pp. 150-158, XP019047687, ISBN: 978-3-540-48766-1.

Taiwan Search Report—TW097114017—TIPO—Nov. 7, 2011.

\* cited by examiner

X A B C D E F G

I a b c d

J e f g h

K i j k l

L m n o p

PRIOR ART

MODE UNIFORMITY SIGNALING FOR INTRA-CODING

TECHNICAL FIELD

The disclosure relates to digital video processing and, more particularly, to techniques for intra-frame video encoding and decoding.

CLAIM OF PRIORITY

This patent application is based on and claims priority to U.S. patent application Ser. No. 60/912,364, filed Apr. 17, 2007, and is a co-pending application of U.S. patent application Ser. No. 12/040,633, filed Feb. 29, 2008, entitled Directional Transforms For Intra-Coding, and U.S. patent application Ser. No. 12/040,673, filed Feb. 29, 2008, entitled Pixel-By-Pixel Weighting For Intra-Frame Coding, all of which can be assigned to the assignee of the present invention, the contents of which are hereby expressly incorporated by reference herein.

BACKGROUND

In video encoding, a frame of a video sequence may be partitioned into rectangular regions or blocks. A video block may be encoded in Intra-mode (I-mode) or Inter-mode (P-mode).

FIG. 1 shows a diagram of a prior art video encoder for the I-mode. An encoder may be configured to partition a frame into a plurality of blocks and encode each of the blocks separately. As an example, the encoder may partition the frame into a plurality of 16×16 "macroblocks" that include sixteen rows of pixels and sixteen columns of pixels. Macroblocks may comprise a grouping of sub-partition blocks (referred to herein as "blocks"). As an example, a 16×16 macroblock may contain sixteen 4×4 blocks, or other size sub-partition blocks.

In FIG. 1, a spatial predictor 102 forms a predicted block 103 from video block 100 by using pixels from neighboring blocks in the same frame. The neighboring blocks used for prediction may be specified by a prediction mode 101. A summer 104 computes the prediction error 106, i.e., the difference between the image block 100 and the predicted block 103. Transform module 108 projects the prediction error 106 onto a set of basis or transform functions. In typical implementations, the transform functions can be derived from the discrete cosine transform (DCT), Karhunen-Loeve Transform (KLT), or any other transforms. For example, a set of transform functions can be expressed as $\{f_0, f_1, f_2, \ldots, f_N\}$, where each $f_n$ denotes an individual transform function.

The transform module 108 outputs a set of transform coefficients 110 corresponding to the weights assigned to each of the transform functions. For example, a set of coefficients $\{c_0, c_1, c_2, \ldots, c_N\}$ may be computed, corresponding to the set of transform functions $\{f_0, f_1, f_2, \ldots, f_N\}$. The transform coefficients 110 are subsequently quantized by quantizer 112 to produce quantized transform coefficients 114. The quantized coefficients 114 and prediction mode 101 may be transmitted to the decoder.

FIG. 1A depicts a video decoder for the I-mode. In FIG. 1A, quantized coefficients 1000 are provided by the encoder to the decoder, and supplied to the inverse transform module 1004. The inverse transform module 1004 reconstructs the prediction error 1003 based on the coefficients 1000 and the fixed set of transform functions, e.g., $\{f_0, f_1, f_2, \ldots, f_N\}$. The prediction mode 1002 is supplied to the inverse spatial prediction module 1006, which generates a predicted block 1007 based on pixel values of already decoded neighboring blocks. The predicted block 1007 is combined with the prediction error 1003 to generate the reconstructed block 1010. The difference between the reconstructed block 1010 and the original block 100 in FIG. 1 is known as the reconstruction error.

An example of a spatial predictor 102 in FIG. 1 is herein described with reference to section 8.3.1 of ITU-T Recommendation H.264, published by ITU—Telecommunication Standardization Sector in March 2005 (hereinafter "H.264-2005"). In H.264-2005, a coder offers 9 prediction modes for prediction of 4×4 blocks, including DC prediction (Mode 2) and 8 directional modes, labeled 0 through 8, as shown in FIG. 2. Each prediction mode specifies a set of neighboring pixels for encoding each pixel, as illustrated in FIG. 3. In FIG. 3, the pixels from a to p are to be encoded, and neighboring pixels A to L and X are used for predicting the pixels a to p. If, for example, Mode 0 is selected, then pixels a, e, i and m are predicted by setting them equal to pixel A, and pixels b, f, j and n are predicted by setting them equal to pixel B, etc. Similarly, if Mode 1 is selected, pixels a, b, c and d are predicted by setting them equal to pixel I, and pixels e, f, g and h are predicted by setting them equal to pixel J, etc. Thus, Mode 0 is a predictor in the vertical direction; and Mode 1 is a predictor in the horizontal direction.

It has been noted that oftentimes a 16×16 macroblock contains 4×4 blocks all encoded using the same prediction mode. It would be desirable to provide an efficient way to signal to a decoder that all blocks in a macroblock are encoded using the same prediction mode.

SUMMARY

An aspect of the present disclosure provides a method for encoding a macroblock, the macroblock comprising a plurality of blocks, each block comprising a set of pixel values, the method comprising for each block, selecting a prediction mode for predicting pixels in the block based on neighboring pixels; and providing a mode uniformity indicator for the macroblock, the mode uniformity indicator indicating whether a plurality of blocks in the macroblock have the same selected prediction mode.

Another aspect of the present disclosure provides a method for predicting a macroblock, the macroblock comprising a plurality of blocks, each block comprising a set of pixel values, the method comprising receiving a prediction mode and a mode uniformity indicator for the macroblock; and if the mode uniformity indicator is true, predicting at least two blocks of the macroblock according to the received prediction mode.

Another aspect of the present disclosure provides an apparatus for generating an encoded macroblock, the macroblock comprising a plurality of blocks, each block comprising a set of pixel values, the encoded macroblock comprising a prediction mode corresponding to at least one block in the macroblock, the prediction mode specifying combinations of neighboring pixels used to predict pixels in the block; and a mode uniformity indicator indicating whether a plurality of blocks in the macroblock have the same prediction mode. In some examples, the apparatus is a handset.

Yet another aspect of the present disclosure provides an apparatus for predicting a macroblock, the macroblock comprising a plurality of blocks, each block comprising a set of pixel values, the apparatus receiving a prediction mode and a mode uniformity indicator for the macroblock, wherein if the mode uniformity indictor is true, the apparatus predicts at least two blocks of the macroblock according to the received prediction mode. In some examples, the apparatus is a handset.

Yet another aspect of the present disclosure provides a computer program product for predicting a macroblock, the macroblock comprising a plurality of blocks, each block comprising a set of pixel values, the product comprising computer-readable medium comprising code for causing a computer to receive a prediction mode and a mode uniformity indicator for the macroblock; code for causing a computer to, if the mode uniformity indicator is true, predict at least two blocks of the macroblock according to the received prediction mode. In some examples, the product is a handset.

BRIEF DESCRIPTION OF DRAWINGS

FIG. 3 illustrates pixel prediction using prediction modes.

DETAILED DESCRIPTION

Figure 1:
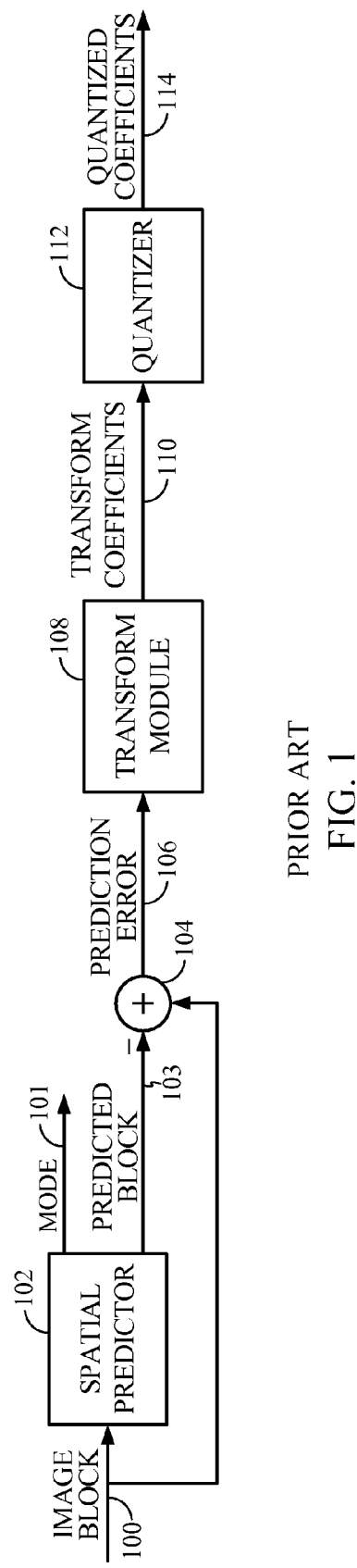
FIG. 1 shows a diagram of a prior art video encoder for the I-mode.
Figure 1A:
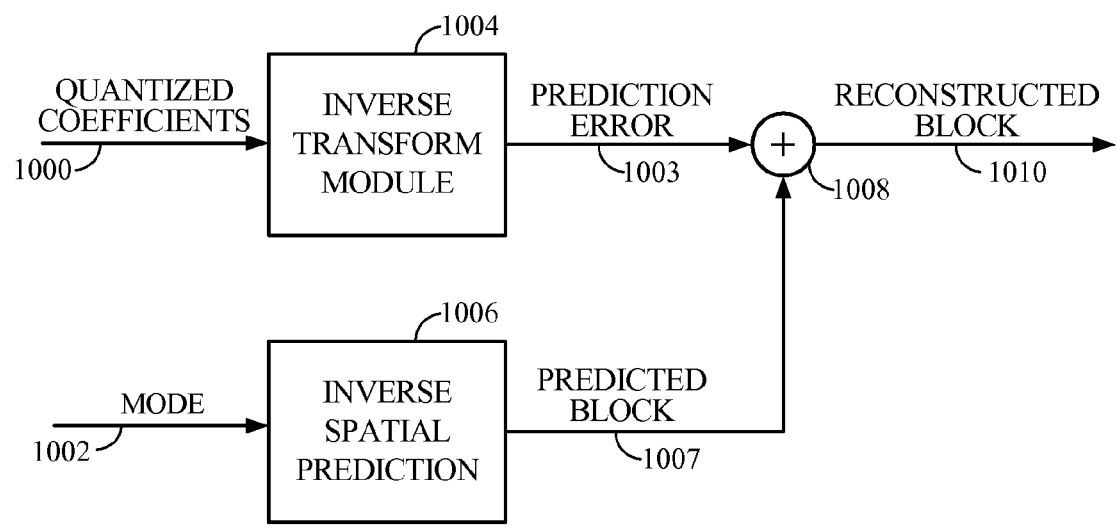
FIG. 1A depicts a prior art video decoder for the I-mode.
Figure 2:
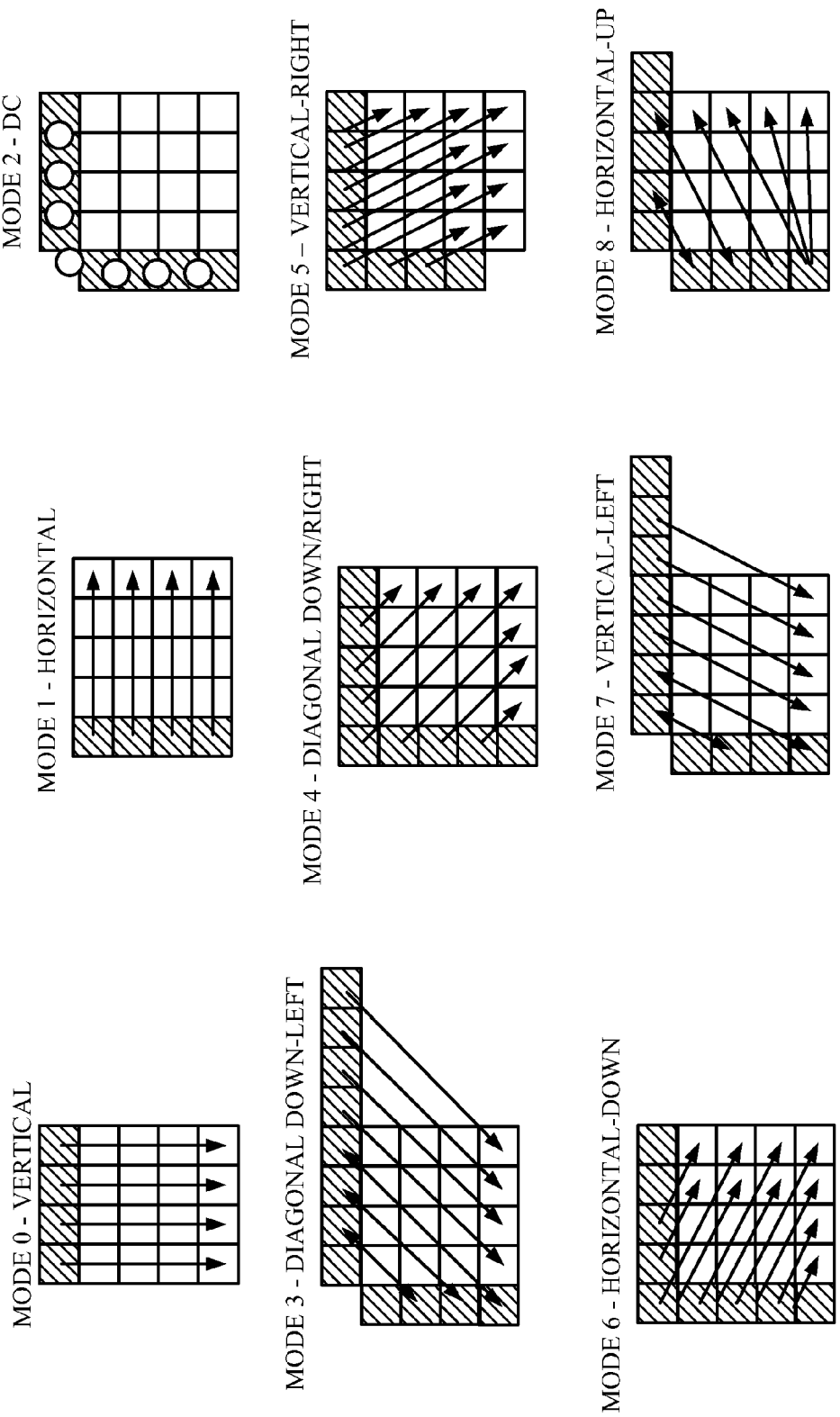
FIG. 2 shows prediction modes described in H.264-2005.

Disclosed herein are techniques to efficiently signal the prediction modes used to encode blocks in a macroblock.

In H.264-2005, a prediction mode is derived for each 4×4 block in a 16×16 macroblock. The prediction mode is signaled from encoder to decoder for each block, i.e., 16 modes per macroblock.

According to the present disclosure, a "mode uniformity" indicator can be signaled on the macroblock level to indicate whether all 4×4 blocks within the macroblock are using the same prediction mode. In an embodiment, the mode uniformity indicator is a bit. If the bit is true, the prediction mode is signaled only once for all the 4×4 blocks in a given macroblock. In an embodiment, the prediction mode is signaled only for the upper left 4×4 block. If the bit is false, the prediction mode is signaled for each 4×4 block, as is prescribed by H.264-2005.

Note the mode uniformity indicator may also be defined to signal mode uniformity for any subset of the blocks in a macroblock. Accordingly, multiple mode uniformity indicators may be provided for a single macroblock for flexibility. For example, a first mode uniformity indicator may be provided for eight 4×4 blocks in the top half of the macroblock, and a second mode uniformity indicator may be provided for eight 4×4 blocks in a bottom half of the macroblock.

Note the techniques disclosed need not be applied to macroblocks having 16×16 pixels, and/or blocks having 4×4 pixels. Other combinations of macroblock and block size may also adopt the signaling described.

In one embodiment, a method is proposed on the macroblock level to signal whether all 4×4 blocks within the macroblock are using the same prediction direction (mode). If yes, the prediction direction (mode) is signaled only once for all the 4×4 blocks in a given macroblock, for example, for the upper left 4×4 block.

In some examples, blocks encoded in P-mode are predicted from one of the previously coded and transmitted frames. The prediction information of a block is represented by a two-dimensional (2D) motion vector. For the blocks encoded in I-mode, the predicted block is formed using spatial prediction from already encoded neighboring blocks within the same frame. The prediction error, i.e., the difference between the block being encoded and the predicted block is represented as a set of weighted basis functions of some discrete transform.

The transform may be performed, e.g., on an 8×8 or 4×4 block basis. The weights—transform coefficients—are subsequently quantized.

In some examples, quantized transform coefficients, together with motion vectors and some control information, form a complete coded sequence representation and are referred to as syntax elements. Prior to transmission from the encoder to the decoder, all syntax elements are entropy coded so as to further reduce the number of bits needed for their representation.

Based on the teachings described herein, it should be apparent that an aspect disclosed herein may be implemented independently of any other aspects and that two or more of these aspects may be combined in various ways. The techniques described herein may be implemented in hardware, software, firmware, or any combination thereof. If implemented in hardware, the techniques may be realized using digital hardware, analog hardware or a combination thereof. If implemented in software, the techniques may be realized at least in part by a computer-program product that includes a computer readable medium on which one or more instructions or code is stored.

By way of example, and not limitation, such computer-readable media can comprise RAM, such as synchronous dynamic random access memory (SDRAM), read-only memory (ROM), non-volatile random access memory (NVRAM), ROM, electrically erasable programmable read-only memory (EEPROM), erasable programmable read-only memory (EPROM), FLASH memory, CD-ROM or other optical disk storage, magnetic disk storage or other magnetic storage devices, or any other tangible medium that can be used to carry or store desired program code in the form of instructions or data structures and that can be accessed by a computer.

The instructions or code associated with a computer-readable medium of the computer program product may be executed by a computer, e.g., by one or more processors, such as one or more digital signal processors (DSPs), general purpose microprocessors, ASICs, FPGAs, or other equivalent integrated or discrete logic circuitry.

A number of aspects and examples have been described. However, various modifications to these examples are possible, and the principles presented herein may be applied to other aspects as well. These and other aspects are within the scope of the following claims.

The invention claimed is:

1. A method for encoding a macroblock, the macroblock comprising a plurality of pixel values and a plurality of sub-partition blocks, each sub-partition block comprising a subset of the plurality of pixel values, the method comprising:
    selecting for a plurality of subsets of the sub-partition blocks of the macroblock a prediction mode defining a prediction direction for predicting pixels for each of the sub-partition blocks of each of the subsets based on neighboring pixels;
    providing a plurality of mode uniformity indicators for the macroblock, each of the mode uniformity indicators indicating for a particular one of the subsets of the sub-partition blocks whether all sub-partition blocks in the particular one of the subsets macroblock are to be predicted according to the same selected prediction mode and the same prediction direction for each of the sub-partition blocks in the particular one of the subsets, wherein a first one of the plurality of mode uniformity indicators indicates whether all of the sub-partition blocks in a first one of the subsets of the sub-partition blocks are to be predicted according to a first prediction mode and a first prediction direction and wherein a second one of the plurality of mode uniformity indicators indicates whether all of the sub-partition blocks in a second one of the subsets of the sub-partition blocks are to be predicted according to a second selected prediction mode and a second prediction direction; and predicting the sub-partition blocks of each of the subsets of the macroblock according to the same prediction mode and the same prediction direction selected for each of the subsets so as to predict the plurality of pixel values of the macroblock.

2. The method of claim 1, wherein the each of the mode uniformity indicators is a mode uniformity bit.

3. The method of claim 1, the each sub-partition block comprising 4×4 pixels, the macroblock comprising 16×16 pixels.

4. A method for predicting a macroblock, the macroblock comprising a plurality of pixel values and a plurality of sub-partition blocks, each sub-partition block comprising a subset of the plurality of pixel values, the method comprising:

receiving a prediction mode and a mode uniformity indicator for each of a plurality of subsets of the sub-partition blocks of the macroblock, each of the mode uniformity indicators indicating for a particular one of the subsets of the sub-partition blocks whether all sub-partition blocks in the particular one of the subsets have a same prediction mode and a same prediction direction, wherein a first one of the plurality of mode uniformity indicators indicates whether all of the sub-partition blocks in a first one of the subsets of the sub-partition blocks are to be predicted according to a first prediction mode and a first prediction direction and wherein a second one of the plurality of mode uniformity indicators indicates whether all of the sub-partition blocks in a second one of the subsets of the sub-partition blocks are to be predicted according to a second selected prediction mode and a second prediction direction; and for each particular one of the subsets, if the mode uniformity indicator for the particular one of the subsets indicates that the all sub-partition blocks in the particular one of the subsets have the same prediction mode defining the same prediction direction, predicting the sub-partition blocks of the particular one of the subsets according to the received prediction mode and the prediction direction for the particular one of the subsets so as to predict the plurality of pixel values of the macroblock.

5. The method of claim 4, the each of the mode uniformity indicators being a mode uniformity bit.

6. The method of claim 4, the each sub-partition block comprising 4×4 pixels, the macroblock comprising 16×16 pixels.

7. An apparatus comprising one or more processors configured to generate an encoded macroblock, the macroblock comprising a plurality of pixel values and a plurality of sub-partition blocks, each sub-partition block comprising a subset of the plurality of pixel values, the one or more processors being further configured to:

receive a prediction mode and a mode uniformity indicator for each of a plurality of subsets of the sub-partition blocks of the macroblock, each of the mode uniformity indicators indicating whether all sub-partition blocks in a respective one of the subsets of sub-partition blocks have a same prediction mode and a same prediction direction, wherein a first one of the plurality of mode uniformity indicators indicates whether all of the sub-partition blocks in a first one of the subsets of the sub-partition blocks are to be predicted according to a first prediction mode and a first prediction direction and wherein a second one of the plurality of mode uniformity indicators indicates whether all of the sub-partition blocks in a second one of the subsets of the sub-partition blocks are to be predicted according to a second selected prediction mode and a second prediction direction; and predict the sub-partition blocks of each of the subsets of the macroblock according to the prediction mode and the prediction direction for each of the subsets so as to predict the plurality of pixel values of the macroblock.

8. The apparatus of claim 7, wherein the each of the mode uniformity indicators is a mode uniformity bit.

9. The apparatus of claim 7, the each sub-partition block comprising 4×4 pixels, the macroblock comprising 16×16 pixels.

10. The apparatus of claim 7, wherein the apparatus is an integrated circuit.

11. An apparatus for predicting a macroblock, the macroblock comprising a plurality of pixel values and a plurality of sub-partition blocks, each sub-partition block comprising a subset of the plurality of pixel values, the apparatus comprising one or more processors configured to receive a prediction mode and a mode uniformity indicator for each of a plurality of subsets of the sub-partition blocks of the macroblock, each of the mode uniformity indicators indicating whether all sub-partition blocks in a respective one of the subsets of sub-partition blocks have a same prediction mode and a same prediction direction, wherein a first one of the plurality of mode uniformity indicators indicates whether all of the sub-partition blocks in a first one of the subsets of the sub-partition blocks are to be predicted according to a first prediction mode and a first prediction direction and wherein a second one of the plurality of mode uniformity indicators indicates whether all of the sub-partition blocks in a second one of the subsets of the sub-partition blocks are to be predicted according to a second selected prediction mode and a second prediction direction; and the one or more processors being further configured to, for each particular one of the subsets, if the mode uniformity indictor for the particular one of the subsets indicates that the all sub-partition blocks in the particular one of the subsets are to be predicted according to the same prediction mode, predict all sub-partition blocks of the particular one of the subsets according to the received prediction mode and the same prediction direction for the particular one of the subsets so as to predict the plurality of pixel values of the macroblock.

12. An apparatus for predicting a macroblock, the macroblock comprising a plurality of pixel values and a plurality of sub-partition blocks, each sub-partition block comprising a subset of the plurality of pixel values, the apparatus comprising one or more processors configured to receive a prediction mode defining a prediction direction and a mode uniformity indicator for the macroblock, the mode uniformity indicator indicating whether all sub-partition blocks in the macroblock have a same prediction mode and a same prediction direction, the one or more processors being further configured to, if the mode uniformity indictor indicates that the all sub-partition blocks in the macroblock are to be predicted according to the same prediction mode, predict all sub-partition blocks of the macroblock according to the received prediction mode and the same prediction direction so as to predict the plurality of pixel values of the macroblock.

13. The apparatus of claim 12, the each of the mode uniformity indicators being a mode uniformity bit.

14. The apparatus of claim 12, the each sub-partition block comprising 4×4 pixels, the macroblock comprising 16×16 pixels.

15. The apparatus of claim 12, wherein the apparatus is an integrated circuit.

16. The apparatus of claim 12, wherein the apparatus is a handset.

17. A computer program product for predicting a macroblock, the macroblock comprising a plurality of pixel values and a plurality of sub-partition blocks, each sub-partition block comprising a subset of the plurality of pixel values, the product comprising:

a non-transitory computer-readable medium storing computer-executable code that, when executed by a computer, causes the computer to:

receive a prediction mode and a mode uniformity indicator for each of a plurality of subsets of the sub-partition blocks of the macroblock, the mode uniformity indicators indicating whether all sub-partition blocks in the subset of sub-partition blocks have a same prediction mode and a same prediction direction, wherein a first one of the plurality of mode uniformity indicators indicates whether all of the sub-partition blocks in a first one of the subsets of the sub-partition blocks are to be predicted according to a first prediction mode and a first prediction direction and wherein a second one of the plurality of mode uniformity indicators indicates whether all of the sub-partition blocks in a second one of the subsets of the sub-partition blocks are to be predicted according to a second selected prediction mode and a second prediction direction; and for each particular one of the subsets, if the mode uniformity indicator for the particular one of the subsets indicates that the all sub-partition blocks in the particular one of the subsets have the same prediction mode defining the same prediction direction, predict the sub-partition blocks of the particular one of the subsets according to the received prediction mode and the prediction direction for the particular one of the subsets so as to predict the plurality of pixel values of the macroblock.

18. The computer program product of claim 17, each of the mode uniformity indicators being a mode uniformity bit.

19. The computer program product of claim 17, the each sub-partition block comprising 4×4 pixels, the macroblock comprising 16×16 pixels.

20. The computer program product of claim 17, wherein the product is a handset.

21. An apparatus configured to generate an encoded macroblock, the macroblock comprising a plurality of pixel values and a plurality of sub-partition blocks, each sub-partition block comprising a subset of the plurality of pixel values, the apparatus comprising:

means for receiving a prediction mode and a mode uniformity indicator for each of a plurality of subsets of the sub-partition blocks of the macroblock, each of the mode uniformity indicators indicating whether all sub-partition blocks in a respective one of the subsets of sub-partition blocks have a same prediction mode and a same prediction direction, wherein a first one of the plurality of mode uniformity indicators indicates whether all of the sub-partition blocks in a first one of the subsets of the sub-partition blocks are to be predicted according to a first prediction mode and a first prediction direction and wherein a second one of the plurality of mode uniformity indicators indicates whether all of the sub-partition blocks in a second one of the subsets of the sub-partition blocks are to be predicted according to a second selected prediction mode and a second prediction direction; and means for predicting the sub-partition blocks of each of the subsets of the macroblock according to the prediction mode and the prediction direction for each of the subsets so as to predict the plurality of pixel values of the macroblock.

* * * * *